United States Patent [19]

Matsuno et al.

[11] Patent Number: 5,259,476
[45] Date of Patent: Nov. 9, 1993

[54] TORQUE DISTRIBUTION CONTROL SYSTEM FOR A FOUR-WHEEL DRIVE MOTOR VEHICLE

[75] Inventors: Koji Matsuno, Kasakake; Kazuya Morota, Nitta; Satoru Watanabe, Musashino; Kiminaga Shirakawa, Ohtsuki, all of Japan

[73] Assignee: Fuji Jukogyo Kabushiki Kaisha, Tokyo, Japan

[21] Appl. No.: 872,622

[22] Filed: Apr. 22, 1992

[30] Foreign Application Priority Data

Apr. 26, 1991 [JP] Japan .................................. 3-123038
Apr. 26, 1991 [JP] Japan .................................. 3-123039

[51] Int. Cl.⁵ .......................................... B60K 17/344
[52] U.S. Cl. .................................... 180/197; 180/248;
364/426.03; 74/866; 192/103 C; 192/0.034
[58] Field of Search ............... 180/248, 249, 197, 233;
364/424.1, 426.01, 426.02, 426.03; 74/866;
192/103 C, 0.034

[56] References Cited

U.S. PATENT DOCUMENTS

| | | | |
|---|---|---|---|
| 4,754,834 | 7/1988 | Ozaki et al. ..................... | 180/233 |
| 4,874,056 | 10/1989 | Naito ............................. | 180/233 |
| 4,953,654 | 9/1990 | Imaseki et al. .................. | 180/248 X |
| 4,986,388 | 1/1991 | Matsuda .......................... | 180/248 |
| 5,010,974 | 4/1991 | Matsuda .......................... | 180/248 X |
| 5,070,961 | 10/1991 | Tezuka ........................... | 180/197 X |
| 5,119,298 | 6/1992 | Naito ............................. | 180/248 X |
| 5,126,942 | 6/1992 | Matsuda .......................... | 180/197 X |
| 5,132,908 | 7/1992 | Eto et al. ....................... | 180/248 X |
| 5,141,072 | 8/1992 | Shibahata ........................ | 180/248 X |
| 5,152,362 | 10/1992 | Naito ............................. | 180/248 |

FOREIGN PATENT DOCUMENTS 63-13824 1/1988 Japan .

Primary Examiner—Margaret A. Focarino
Assistant Examiner—Florian Zeender
Attorney, Agent, or Firm—Martin A. Farber

[57] ABSTRACT

An ideal lateral acceleration is calculated based on vehicle speed and steering angle, and an actual lateral acceleration is calculated based on a lateral acceleration detected by a lateral G sensor. A breakaway point of tires is determined by comparing the actual lateral acceleration with the ideal lateral acceleration. A differential operation of a central differential is controlled by restricting the differential operation in accordance with a determined breakaway point and the difference between the ideal lateral acceleration and the actual lateral acceleration.

2 Claims, 10 Drawing Sheets

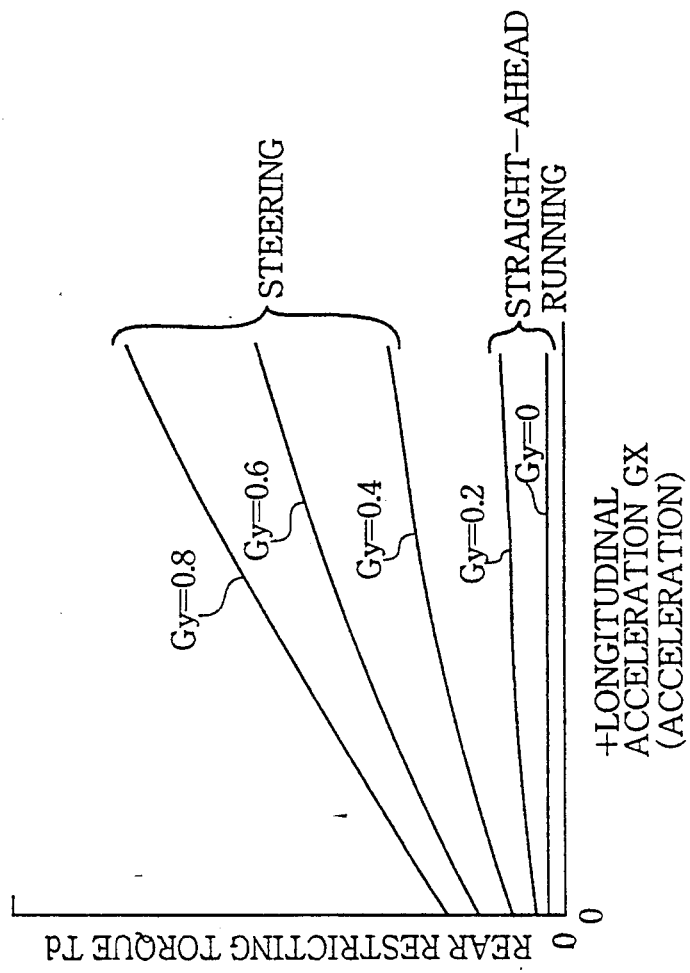
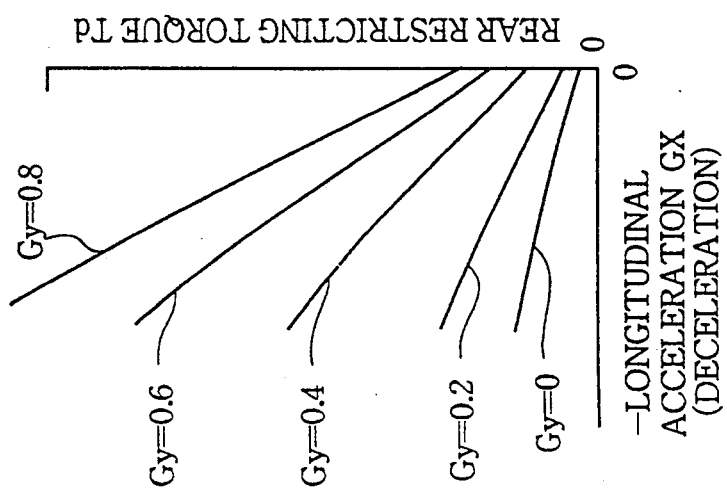

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential, and more particularly to such a control system in which output torque of a transmission is unequally distributed to front wheels and rear wheels in accordance with driving conditions of the motor vehicle. A differential operation restricting clutch is provided in the central differential for restricting the differential operation. The torque distributed to the front wheels and rear wheels is controlled by controlling the restricting torque of the clutch.

It is known that driving performance of a motor vehicle differs with the type of power transmission system. For example, in a four-wheel drive motor vehicle, the four wheels are driven to prevent slipping and skidding of the wheels, thereby improving driving performance in traction, braking, and steering. The acceleration or deceleration influences the front wheels and the rear wheels at the same time, so that both understeer and oversteer of the vehicle are reduced.

Furthermore, in the four-wheel drive motor vehicle, the torque distribution to the front wheels and rear wheels and to the left rear-wheel and right rear-wheel affects the steerability and the change of running behavior. If the torque distribution is properly controlled, driveability and dynamic stability are further improved. Consequently, it has been proposed to properly and variably control the torque distribution in dependency on the driving conditions.

Japanese Patent Application Laid-open 63-13824 discloses a torque distribution control system having a central differential for a four-wheel drive motor vehicle. In the system, a fluid operated multiple-disk friction clutch is provided in the central differential for restricting the differential operation. The torque distribution to the front and rear wheels is controlled by controlling the restricting torque. The cornering behavior of the vehicle can be detected by lateral acceleration. If the lateral acceleration increases, the gripping force of the tire gradually reduces to a breakaway point, at which the tires begin to slide sideways to cause spinning or drifting of the vehicle. Therefore, the restricting torque is set in dependency on the lateral acceleration for controlling the torque distribution to the front and rear wheels, thereby preventing the sliding of the tires.

However, the cornering condition can be detected only in a linear zone where the side force changes linearly. When the gripping force of the tire approaches that of the breakaway point, the side force changes irregularly. Consequently, the actual lateral acceleration changes irregularly with the behavior of the vehicle. Therefore, the system can not prevent the vehicle from spinning and drifting in the non-linear side force zone.

SUMMARY OF THE INVENTION

An object of the present invention is to provide a torque distribution control system for a four-wheel drive motor vehicle which may ensure driveability, driving stability and steerability even if the gripping force of tires approaches that of a breakaway point.

According to the present invention, there is provided a control system for distributing torque to each wheel of a four-wheel drive motor vehicle having, an engine mounted on the motor vehicle, a transmission connected to the engine, an output member of the transmission operatively connected to each wheel for transmitting the torque from the engine to each wheel, a differential interposed between each wheel for absorbing a speed difference of each wheel, a clutch mounted on the differential for controlling torque distribution to each wheel, a vehicle speed sensor for detecting a vehicle speed and for generating a vehicle speed signal, a lateral G-sensor for detecting acceleration in a lateral direction of the motor vehicle and for generating a lateral acceleration signal, and a steering angle sensor mounted on a front wheel shaft for sensing a steering angle and for producing a steering angle signal.

The system comprises ideal acceleration calculating means responsive to the vehicle speed signal and the steering angle signal for calculating an ideal acceleration by referring to a standard value in a map and for producing an ideal acceleration signal, actual acceleration calculating means responsive to the lateral acceleration signal for calculating an actual acceleration and for producing an actual acceleration signal, determining means responsive to the ideal and actual acceleration signals for determining a breakaway point by comparing actual data with breakaway data and for producing a breakaway signal, difference calculating means responsive to the ideal and actual acceleration signals for calculating a spinning degree of the motor vehicle and for producing an absolute signal, and setting means responsive to the breakaway and absolute signals for deciding (setting) a duty ratio of a solenoid valve in order to obtain optimum control of the clutch so as to accurately minimize the spinning degree of the motor vehicle and to improve stability of vehicle behavior.

The other objects and features of this invention will become understood from the following description with reference to the accompanying drawings.

BRIEF DESCRIPTION OF DRAWINGS

FIGS. 9a and 9b are graphs showing the controlling characteristics of a rear differential restricting torque;

DETAILED DESCRIPTION OF THE PREFERRED EMBODIMENTS

Figure 1:
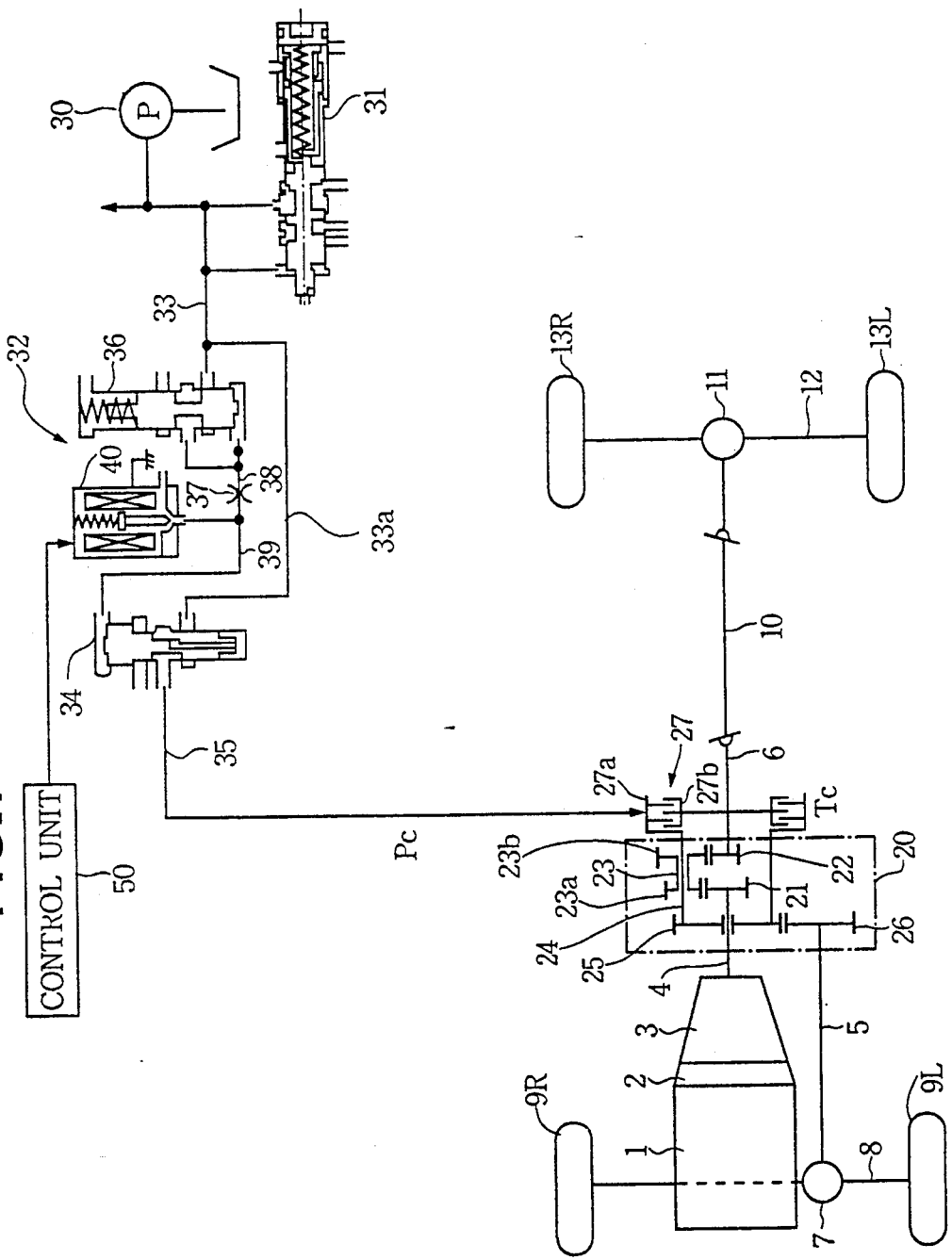
FIG. 1 shows a power transmission system for a four-wheel drive motor vehicle according to the present invention.

FIG. 1 shows a power transmission system for a four-wheel drive motor vehicle having a central differential according to the present invention. An engine 1 is mounted on a front portion of the vehicle. A clutch 2 and a transmission 3 are disposed at a rear of the engine 1 in a longitudinal direction of the vehicle. An output of the transmission 3 is transmitted to an output shaft 4 which is aligned with a central differential 20. The output shaft 4 is connected to a front drive shaft 5 which is disposed in parallel under the transmission 3 through a pair of reduction gears 25 and 26 of the central differential 20. The front drive shaft 5 is connected to left and right front wheels 9L and 9R through a front differential 7 and axles 8. The output shaft 4 is connected to a rear drive shaft 6 through the central differential 20. The rear drive shaft 6 is connected to the left and right rear wheels 13L and 13R through a propeller shaft 10, a rear differential 11 and axles 12.

The central differential 20 is a complex planetary gear device and comprises a first sun gear 21 integrally formed on the output shaft 4, a second sun gear 22 integrally formed on the rear drive shaft 6, and a combined planetary pinion 23 comprising a first planetary pinion 23a meshed with the first sun gear 21, and a second planetary pinion 23b meshed with the second sun gear 22, and supported on a carrier 24. The carrier 24 is connected to the reduction drive gear 25.

Thus, an output torque from the output shaft 4 of the transmission 3 is transmitted to the carrier 24 and the second sun gear 22 through the first sun gear 21 and the pinions 23a, 23b at predetermined respective torque distribution ratios. A difference between rotating speeds of the carrier 24 and the second sun gear 22 is absorbed by rotation of the first and second planetary pinions 23a and 23b.

Consequently, a standard torque distribution for front torque $T_F$ and rear torque $T_R$ can be set to various values by changing radii of pitch circles of the sun gears 21 and 22 and the pinions 23a and 23b.

Thus, the torque distribution ratio et of the front wheels 9L, 9R and the rear wheels 13L, 13R is determined as follows:

$$T_F:T_R \approx 34:66$$

A large standard torque can be distributed to the rear wheels 13L, 13R.

A fluid operated multiple-disk friction clutch 27 is provided adjacent the central differential 20 for restricting the differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheel 9L, 9R, thereby changing the distribution of the torque. The carrier 24 is coupled with the second sun gear 22 when the clutch 27 is entirely engaged, thereby locking the central differential 20.

In the vehicle with the front-mounted engine, static weight distribution ew of front dynamic weight WF and rear dynamic weight WR are determined as follows:

$$WF:WR \approx 62:38$$

When the clutch 27 is directly engaged, the distribution ratio et of the front torque and rear torque is set in accordance with the weight distribution ew. Thus, the torque distribution is controlled in a range between the standard torque distribution of 34:66 weighted to the rear wheels 13L, 13R and a torque distribution of 62:38, weighted to the front wheels 9L, 9R at complete engagement of the clutch 27 in accordance with the differential operation restricting clutch torque Tc.

A hydraulic circuit for controlling the clutch 27 will be described hereinafter.

The hydraulic circuit having a control system 32 for the clutch 27 comprises an oil pump 30, a pressure regulator valve 31, a pilot valve 36, a clutch control valve 34 and a solenoid operated duty control valve 40. The regulator valve 31 operates to regulate a pressure of oil supplied from the oil pump 30 driven by the engine 1 to produce a line pressure and the line pressure is applied to a line pressure conduit 33. The conduit 33 is communicated with a passage 38 through the pilot valve 36. The passage 38 is communicated with the solenoid operated duty control valve 40 downstream of an orifice 37, and with an end of the clutch control valve 34 through a passage 39. The conduit 33 is communicated with the clutch control valve 34 through a passage 33a. The clutch control valve 34 is communicated with the clutch 27 through a passage 35. The solenoid operated valve 40 is operated by pulses from a control unit 50 at a duty ratio determined therein, thereby controlling the drain oil therefrom to provide a control pressure Pd. The control pressure is applied to the clutch control valve 34 to control the oil supplied to the clutch 27 so as to control the clutch pressure (torque) and hence the differential operation restricting torque Tc.

Figure 2:
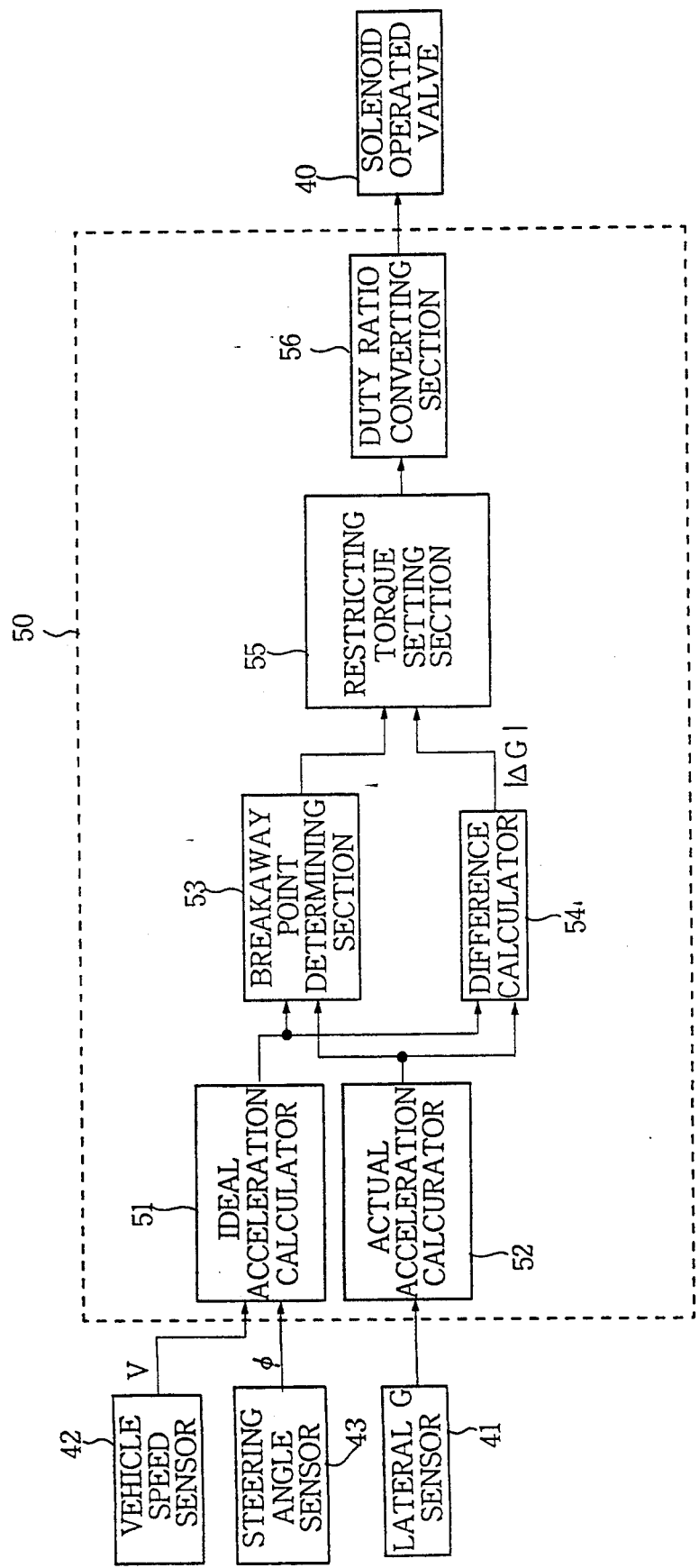
FIG. 2 is a block diagram of a control unit.

FIG. 2 shows the control unit 50. Describing the principle of the control system, the actual cornering condition of the vehicle can be detected by an actual lateral acceleration from a lateral G sensor. At cornering, an ideal lateral acceleration can be calculated from steering angle, vehicle speed and stability factors of the vehicle. The calculated ideal lateral acceleration can be used as an ideal value in a breakaway zone as well as in a grip zone of the tire. The actual lateral acceleration is equal to the ideal lateral acceleration in the grip zone. If the tire approaches a breakaway point in the non-linear side force zone, the actual lateral acceleration becomes smaller than the ideal lateral acceleration. It may occur that the actual lateral acceleration becomes larger than the ideal lateral acceleration when the vehicle spins. Therefore, the breakaway point can be determined by comparing the actual lateral acceleration with the ideal lateral acceleration. The system is designed so that the larger standard torque et is distributed to the rear wheels. Consequently, the restricting torque Tc is controlled in dependency on the difference between the actual and ideal lateral accelerations, so that the torque to the rear wheels is reduced to increase the torque to the front wheels, thereby preventing the spinning of the vehicle.

The system for controlling the torque distribution to the front wheels and the rear wheels will be described.

The control unit 50 is provided with a lateral G sensor 41 for detecting lateral acceleration of the vehicle body, a vehicle speed sensor 42 for detecting vehicle speed V, and a steering angle sensor 43 for detecting a steering angle $\phi$ at cornering.

The control unit 50 further has an ideal acceleration calculator 51 to which the vehicle speed V and the steering angle $\phi$ are applied. In accordance with the input signals V and $\phi$, stability factor A of the vehicle and a wheelbase L, the ideal acceleration in the lateral direction of the vehicle body is calculated by an equation as follows.

$$\text{ideal lateral acceleration} = (1/(1+AV^2)) \cdot V^2 \phi / L$$

The stability factor A is an inherent value for the vehicle. From the equation, it will be seen that the ideal lateral acceleration becomes large if the vehicle speed V and the steering angle $\phi$ are large and if the wheelbase L is small. If the stability factor A has steering characteristics of positive understeer, the ideal lateral acceleration becomes small. To the contrary, if the stability factor A has a steering characteristic of negative oversteer, the ideal lateral acceleration becomes large.

An actual acceleration calculator 52 is applied with lateral acceleration from the sensor 41. In the calculator 52, the lateral acceleration is corrected in accordance with lateral load distribution on the vehicle dependent on the passenger and the cargo in order to calculate the actual lateral acceleration. The ideal lateral acceleration and the actual lateral acceleration are applied to a breakaway point determining section 53 in which the ideal and actual lateral accelerations are compared with each other. When the actual acceleration is unequal to the ideal acceleration, a breakaway point of the tire is determined.

The ideal lateral acceleration and the actual lateral acceleration are further applied to a difference calculator 54 in which a difference $\Delta G$ between the ideal acceleration and actual acceleration is calculated for determining the magnitude of the spin or drift of the vehicle. In the breakaway point, since the actual acceleration may become larger than the ideal acceleration, an absolute difference $|\Delta G|$ is obtained in the calculator 54.

Figure 3:
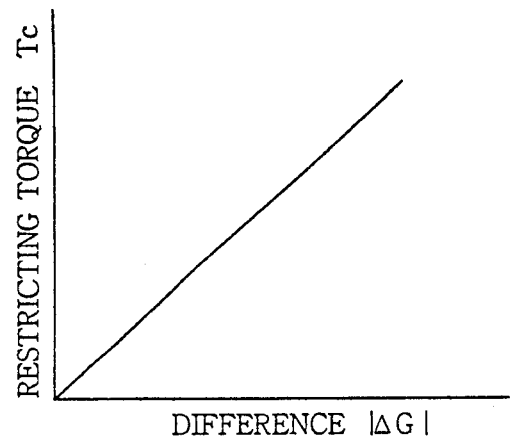
FIG. 3 is a graph showing a look-up table for a differential operation restricting torque corresponding to lateral acceleration difference.

The absolute difference $|\Delta G|$ and an output signal from the breakaway point determining section 53 are applied to a restricting torque setting section 55. In accordance with the input signal, the torque setting section 55 retrieves a torque Tc from a look-up table as shown in FIG. 3. When the vehicle spins a lot, it is necessary to increase the torque distributed to the front wheels for preventing the spin. In the look-up table of FIG. 3, the restricting torque Tc is determined as an increasing function of the absolute difference $|\Delta G|$.

The restricting torque Tc is applied to a duty ratio converting section 56 where the torque Tc is converted to a corresponding duty ratio D. The duty ratio D provided at the section 56 is applied to the solenoid operated duty control valve 40.

The operation of the system will be described hereinafter. The power of the engine 1 is transmitted to the transmission 3 through the clutch 2 at which the transmission ratio is controlled. The output of the transmission 3 is transmitted to the first sun gear 21 of the central differential 20. The front torque and the rear torque are determined in accordance with the radii of the gears of the central differential 20 and the clutch torque Tc of the clutch 27 to distribute a larger torque to the rear wheels 13L, 13R than to the front wheels 9L, 9R. The torque is transmitted to the front wheels 9L and 9R through the carrier 24, the reduction drive gear 25, the reduction driven gear 26, the front drive shaft 5 and the front differential 7. The torque is transmitted to the rear wheels 13L, 13R through the second sun gear 22, the rear drive shaft 6, the propeller shaft 10, and the rear differential 11.

In the control unit 50, the actual lateral acceleration is calculated in accordance with the signal from the sensor 41, and the ideal lateral acceleration is calculated from vehicle speed V, steering angle $\phi$ and the stability factor A for determining the breakaway point of a gripping force of the tire.

If a vehicle is driven on the dry road having a high friction coefficient $\mu$, the grip force and the side force on the tire are large. At cornering, the actual lateral acceleration is equal to the ideal lateral acceleration, so that a gripping force which is not on a breakaway point, is determined in the control unit 50. Thus, the torque Tc is determined as zero. A signal corresponding to a large duty ratio D is applied to the solenoid operated duty control valve 40. Thus, in the control system 32, the clutch control pressure Pd becomes zero and the clutch control valve 34 operates to close the passage 35, thereby draining the oil from the clutch 27. The clutch 27 is disengaged and the clutch torque becomes zero so as to render the central differential 20 free.

Figure 4:
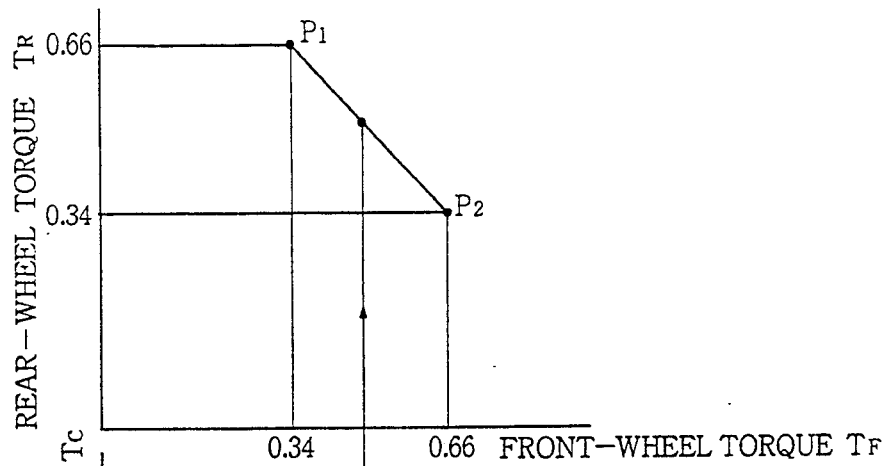
FIG. 4a is a graph showing a relationship between front-wheel torque and rear-wheel torque.
FIG. 4b is a graph showing characteristics of differential operation restricting torque in accordance with the lateral acceleration difference.
Figure 4:
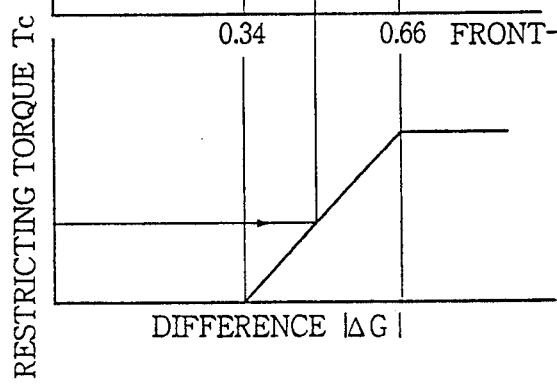

Accordingly, the torque of the reduction drive gear 25 is transmitted to the front wheels 9 through the reduction driven gear 26, the front drive shaft 5 and the front differential 7 at the ratio of 34%. The torque at distribution ratio of 66 % is transmitted to the rear wheels 13 through the second sun gear 22, the rear drive shaft 6, propeller shaft 10 and rear differential 11. Thus, a full-time four-wheel driving is established at a point P1 of FIG. 4a. Although a full-time four-wheel driving is established, steerability and operability of the vehicle is preferably provided like a rear-drive vehicle.

When the vehicle makes a turn, the rotating difference in speeds of the front and rear wheels is absorbed by the rotation of first and second pinions 23a and 23b in the central differential 20, so that the vehicle obtains smooth cornering characteristics.

If the vehicle is driven on a slippery road, the rear wheels are subject to slip first because the larger amount of torque is distributed to the rear wheels. When the gripping force of the tire reaches the breakaway point, the rear wheels start slipping to spin the vehicle. In this state, the actual lateral acceleration is smaller than the ideal lateral acceleration. Thus, the breakaway point is determined and a restricting torque Tc is set in dependency on the absolute difference $|\Delta G|$. A corresponding duty signal is applied to the solenoid operated valve 40. The clutch torque Tc is produced in the clutch 27 by the hydraulic control system 32. The clutch 27 is provided in parallel with the carrier 24 and the second sun gear 22 of the central differential 20 and the differential operation of the central differential 20 is restricted. Accordingly, the torque is transmitted from the second sun gear 22 to the carrier 24 to increase the torque to the front wheels. When the front differential 20 is directly engaged, the torque is distributed to the front wheels and the rear wheels at a point P2 of FIG. 4a in accordance with weight distribution on the front wheels. Thus, the torque to the rear wheels is reduced to suppress the spin, thereby providing safe driving.

If the actual lateral acceleration becomes larger than the ideal lateral acceleration after the spinning of the vehicle, the restricting torque Tc is set independency on the absolute difference $|\Delta G|$ to increase the torque distributed to the front wheels. Consequently, the characteristics at the breakaway point are insured. Since the torque to the front wheels is increased to eliminate the slipping of the rear wheels, the driveability is improved.

From the foregoing, in the embodiment, the actual lateral acceleration is compared with the ideal lateral acceleration calculated by the equation, so that the breakaway point at cornering is accurately determined. The restricting torque is determined in dependency on the difference between the ideal and actual lateral accelerations for controlling the torque distribution to the front and rear wheels. Thus, the vehicle is effectively prevented from spinning and drifting. Since the absolute difference is used, the cornering performance near the breakaway point is properly improved.

Figure 5:
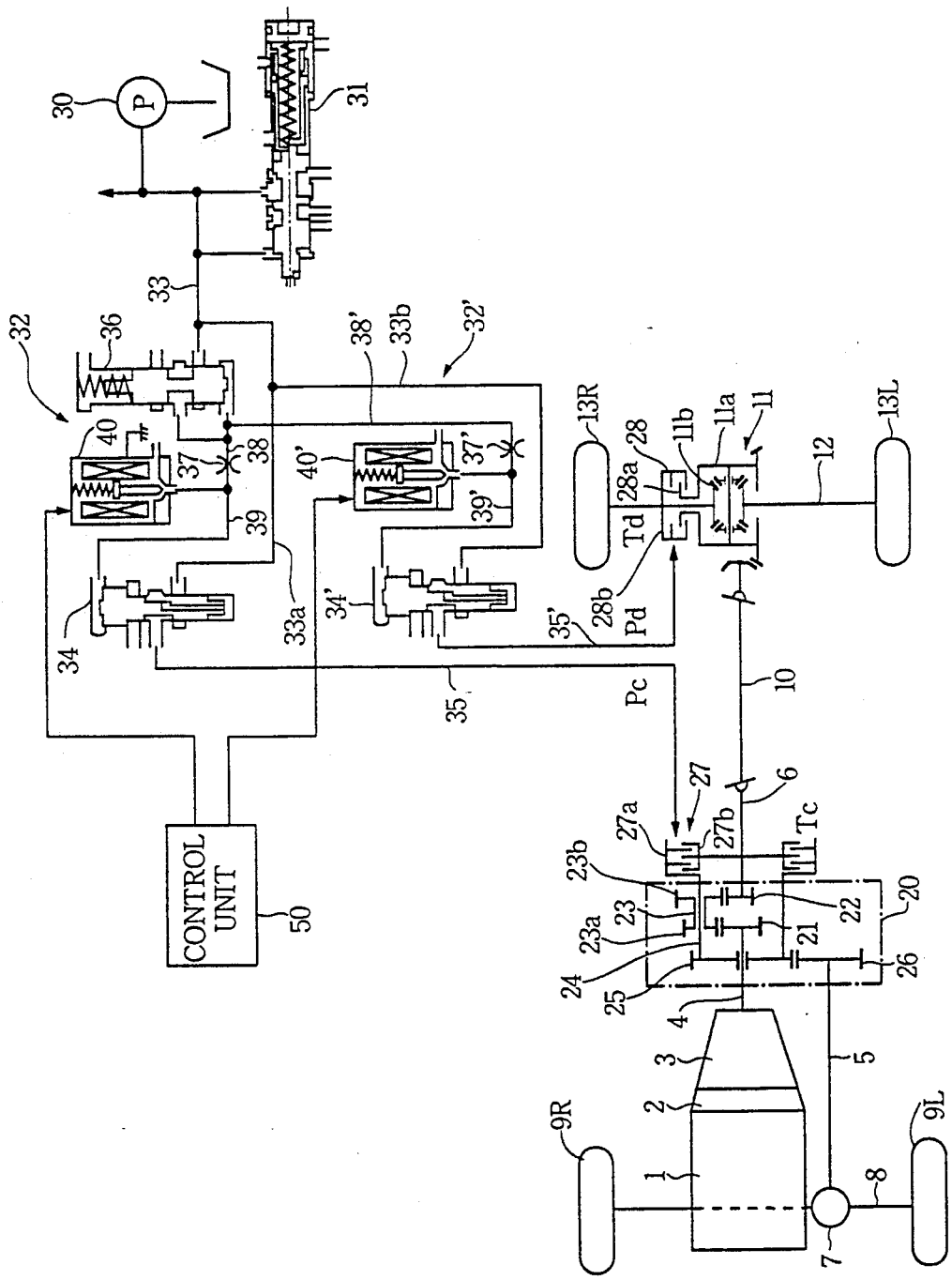
FIG. 5 is a schematic illustration showing a second embodiment of the present invention.

FIG. 5 shows the second embodiment. A power transmission system of the second embodiment is provided with a fluid operated multiple-disk friction clutch 28 provided adjacent the rear differential 11 for restricting the differential operation of the differential 11. The rear differential 11 comprises a bevel gear differential device mounted in a differential case 11a. The clutch 28 comprises a drive drum 28a secured to the differential case 11a, and a driven drum 28b secured to one of the axles 12 connected to a side gear 11b of the differential 11.

When the clutch 28 is released, the torques are equally distributed to the left and right wheels 13L and 13R. When the clutch 28 is engaged, thereby generating a differential operation restricting torque Td, the differential operation of the rear differential 11 is restricted. The torque distribution ratio of the left and right wheels are determined in accordance with left and right dynamic weights W on the left and right wheels 13L and 13R, and the friction coefficient $\mu$ of the road surface (W.·).

A hydraulic circuit for controlling the clutch 28 will be described hereinafter. A control system 32' for the clutch 28 is operatively connected to the control system 32 for the clutch 27.

The control system 32' for the clutch 28 comprises a clutch control valve 34' and a solenoid operated duty control valve 40'. The passage 38 from the pilot valve 36 is communicated with a passage 38' which is communicated with the solenoid operated duty control valve 40' downstream of an orifice 37', and with an end of the clutch control valve 34' through a passage 39'. The conduit 33 is communicated with the clutch control valve 34' through a passage 33b. The clutch control valve 34' is communicated with the clutch 28 through a passage 35'. The solenoid operated valve 40' is operated in the same manner as the solenoid operated valve 40 to provide a control pressure Pd'. The control pressure is applied to the clutch control valve 40' to control the oil supplied to the clutch 28 so as to control the clutch pressure (torque) and hence the differential operation restricting torque Td.

Figure 6:
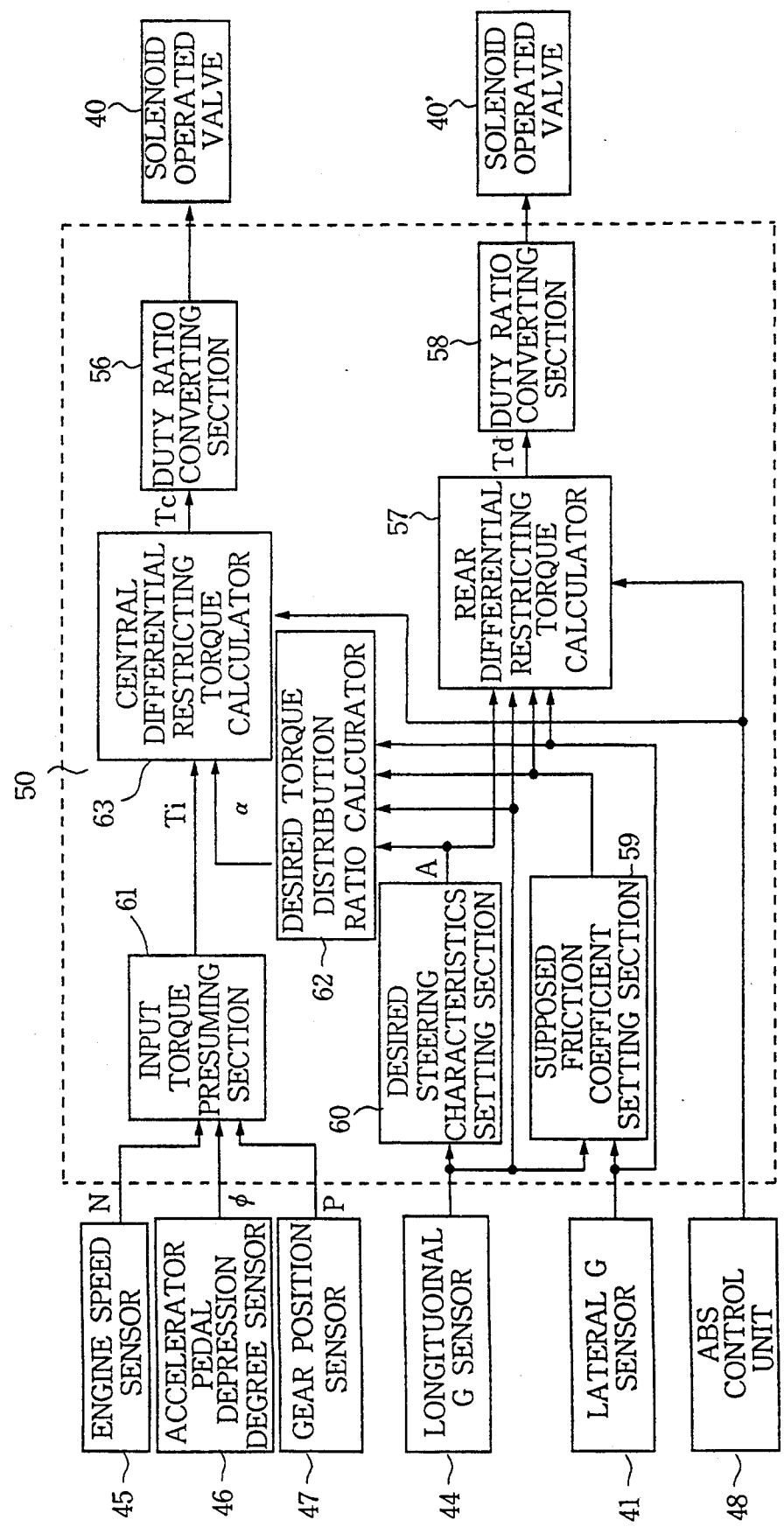
FIG. 6 is a block diagram of the second embodiment.

FIG. 6 shows the control unit 50 of the second embodiment. A system for controlling the torque distribution to the front wheels and the rear wheels and to a left rear-wheel and a right rear-wheel will be described.

The principle of the control system is described first. In order to obtain stable driving of the vehicle during driving on a dry road, and to prevent the spin of the vehicle for obtaining stability on a slippery road, it is necessary to control the torque distribution so as to provide a good steering characteristic in various road conditions and driving conditions, namely to control the stability factor to be constant.

If the vehicle makes a turn at acceleration during four-wheel driving, the cornering power and the side force at the front tires are reduced due to longitudinal weight transfer, and the cornering power and the side force at the rear tires are increased, causing understeering. The relationship between the driving power and the side force of the tire is determined in accordance with a friction circle (i.e. a circle of static function force) in accordance with the friction coefficient $\mu$ of the road and the load on the vehicle. If the driving power is increased, the side force reduced, which affects the steering characteristic. Therefore, in order to obtain a desired steering characteristic, the driving power of the rear tires is increased to reduce the side force for cancelling the increase of the cornering power of the rear tires.

When driving with the rear tires, a yawing moment is produced on the vehicle body, which influences the steering characteristic. The driving conditions of the rear tires depend on the input driving power. If the input driving power is small or the engine braking is effected, the outside tire of the rear tires is braked and the driving power of the inside tire increases, so that the yawing moment is produced in an understeer direction. If the input driving power is large, the driving power produces an effect in dependency on the contact load of the tires, so that the yawing moment is produced in an oversteer direction. Therefore, the torque distribution to the left rear tire and the right rear tire is controlled so as to maintain a good steering characteristic in accordance with the driving conditions.

For actually controlling the central differential at acceleration, desired steering characteristics are set at a side with respect to a neutral point, at which the understeer is reduced. To the contrary, for deceleration, the desired steering characteristics are set at a side where the understeer is increased.

Furthermore, the desired steering characteristic is expanded up to the non-linear side force zone and determined in accordance with the stability factor, thereby setting an equivalent cornering power. The cornering power of the front wheels and the rear wheels is obtained by the friction coefficient $\mu$ of the road, torque distribution ratio to front and rear wheels, and longitudinal and lateral accelerations. The friction coefficient is substituted with a supposed friction coefficient calculated by the square root of a sum which is obtained by adding a square number of the longitudinal acceleration and a square number of the lateral acceleration. The supposed coefficient is smaller than the actual coefficient so that the control is performed at a stable side. The supposed coefficient approaches the actual coefficient in the breakaway zone.

It has been found that the cornering power of the tire can be substituted for an equivalent cornering power which is expressed in a predetermined equation by an equation of motion, if the motion at acceleration and deceleration during the cornering, which generates large longitudinal and lateral accelerations, is formalized, extended in the non-linear zone. Thus, if the torque distribution ratio to the front wheels and the rear wheels changes, the equivalent cornering power on the front wheels and the rear wheels is changed; accordingly, as a result, the steering characteristics of the vehicle change. Therefore, the equivalent cornering power in consideration of non-linearity is a function of longitudinal acceleration G, lateral acceleration, and a supposed friction coefficient sμ. Consequently, a torque distribution ratio α to the front and rear wheels controlled by the central differential can be calculated by equations as follows.

$$\alpha = 1 - \sqrt{-C/A} \quad (1)$$

$$A = \left(Kro + \frac{hW}{2L} \cdot KrcGx\right) \cdot \frac{LrL^2}{2\mu^3 Lf^2} \cdot Gx^2 \, Gr \quad (2)$$

$$C = Lf\frac{\partial Yf}{\partial \beta f} - Lr\frac{\partial Yr}{\partial \beta r} + A1L^2 \frac{\partial Yf}{\partial \beta f} \cdot \frac{\partial Yr}{\partial \beta r} \cdot \frac{g}{W} \quad (3)$$

$$\frac{\partial Yf}{\partial \beta f} = 2\left(Kfo - \frac{hW}{2L} \cdot KrcGx - Kfo\frac{Gy}{2\mu}\right) \quad (4)$$

$$\frac{\partial Yr}{\partial \beta r} = 2\left(Kfo - \frac{hW}{2L} \cdot KrcGx - Kro\frac{Gy}{2\mu}\right) \quad (5)$$

where /Gx is the longitudinal acceleration, Gy is the lateral acceleration, μ is the supposed friction coefficient, A is the desired stability factor, W is the weight of the vehicle, h is the height of the center of gravity, L is the wheelbase, Lf and Lr are distances between the center of gravity and respective axles, Kfo and Kro are equivalent cornering power in a linear zone, and Kfc and Krc are partial differentials of Kf and Kr with respect to W, which represent a load dependent characteristic of the cornering power.

Describing a concrete control of the rear differential, the moment in the understeer direction is proportional to the yawing rate and inversely proportional to the vehicle speed. The moment in the direction of the oversteer is proportional to the driving power to the rear wheels and the lateral acceleration G, since the driving power is large in such a state. Both of the moments are added to calculate the entire yawing moment. The calculated yawing moment is substituted for an equation of motion at a steady circular cornering which is expanded to a non-linear zone and expressed by the stability factor and rewritten in the rear differential restricting torque Td which is calculated by an equation as follows.

$$Td = \quad (6)$$

$$\pm \frac{-\left(\frac{W}{g}\right) \cdot \left(Lf\frac{\partial Yf}{\partial \beta f} - Lr\frac{\partial Yr}{\partial \beta r}\right) - A2L^2 \frac{\partial Yf}{\partial \beta f} \cdot \frac{\partial Yr}{\partial \beta r}}{\frac{\partial Yf}{\partial \beta f} + \frac{\partial Yr}{\partial \beta r}} \cdot \frac{GyRT}{d}$$

where d is the tread, and Rt is the effective diameter of the tire. It is assumed that the equation is plus when $Gx \geq 0$ and minus when $Gx < 0$.

Referring to FIG. 6, the control unit 50 is provided with a longitudinal G sensor 44 for detecting an acceleration Gx in the longitudinal direction of the vehicle and the lateral G sensor 41. In order to presume an input torque to the central differential 20, there are provided an engine speed sensor 45, an accelerator pedal depression degree sensor 46, and a gear position sensor 47. Further, a signal of an antilock brake system (ABS) control unit 48 is applied to the control unit 50.

Figure 7:
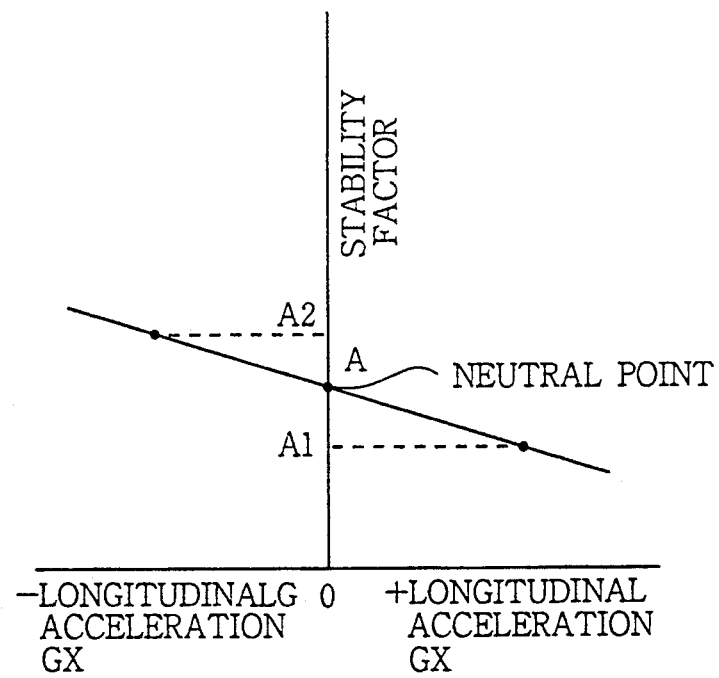
FIG. 7 is a graph showing stability factor of steering characteristics.

The control unit 50 has a supposed friction coefficient setting section 59 applied with the longitudinal acceleration Gx and the lateral acceleration Gy. In the section 59, a supposed friction coefficient sμ is calculated by the square root of square numbers of the longitudinal and lateral accelerations $$(\sqrt{GX^2 + GY^2}),$$

as described above. A desired steering characteristic setting section 60 is applied with the longitudinal acceleration Gx. In the section 60, the stability factor is derived from a look-up table as shown in FIG. 7. If the longitudinal acceleration Gx is large at acceleration, a small stability factor A1 is determined with respect to the neutral point. If the longitudinal acceleration Gx is small at deceleration, a large stability factor A2 is determined.

An input torque presuming section 61 is applied with an engine speed N, an accelerator pedal depression degree Θ and a gear position P from the sensors 45, 46 and 47. In the section 61, engine output Te is presumed in accordance with the engine speed N and the accelerator pedal depression degree Θ with reference to the output characteristic of the engine. The engine output Te is multiplied by a gear ratio g of the gear position P to calculate input torque Ti.

The lateral and longitudinal accelerations Gy·Gx, a stability factor A at acceleration or deceleration, and the supposed friction coefficient sμ are applied to a desired torque distribution ratio calculator 62. The torque distribution ratio α to the front wheels and the rear wheels is calculated in accordance with the equations (1) to (5). The torque distribution ratio α and the input torque Ti are applied to a central differential operation restricting torque calculator 63 for calculating the restricting torque Tc for restricting the differential operation of the central differential 20. The torque distribution ratio α is determined between zero for the rear wheels and one for the front wheels (RWD 0 and FWD 1). If a standard torque distribution ratio Di to the rear wheels is larger than that to the front wheels, the restricting torque Tc is calculated by an equation as follows.

$$Tc = (\alpha + Di)Ti$$

If the calculated value is negative, the torque Tc is set to zero.

The restricting torque Tc is applied to a duty ratio converting section 56 where the torque Tc is converted to a corresponding duty ratio D. The duty ratio D provided at the section 56 is applied to the solenoid operated duty control valve 40.

The lateral and longitudinal accelerations Gx, Gy, stability factor A and the friction coefficient sμ are further applied to a rear differential operation restricting torque calculator 57 in which restricting torque Td for restricting the differential operation of the rear differential 11 is calculated in accordance with the equation (6).

The restricting torque Td is applied to a duty ratio converting section 58 where the torque Td is converted to a corresponding duty ratio D. The duty ratio D provided at the section 58 is applied to the solenoid operated duty control valve 40'.

If an ABS control signal is fed from the unit 48 to the calculators 63 and 57, each of the duty ratios D is forcibly corrected so as to set the respective restricting torques Tc and Td to zero.

The operation of the system will be described hereinafter.

In the system, the rear torque determined in accordance with the central differential 20 and the clutch 27 is transmitted to the rear wheels 13L, 13R through the rear differential 11 and the rear clutch 28.

If the clutch 28 is disengaged and the clutch torque becomes zero so as to render the rear differential 11 free, accordingly, the torque is equally transmitted to the left rear-wheel 13L and the right rear-wheel 13R.

When the restricting torque Td is produced in the rear restricting clutch 28 by the hydraulic control system 32', the rear clutch 28 is engaged and the differential operation of the rear differential 11 is restricted. Thus, the torque is effectively distributed to the rear wheels which grip the ground. The torque is transmitted from a higher speed wheel to a lower speed wheel responsive to the torque Td. When the rear differential 11 is directly engaged, the torque is distributed to the left rear wheel 13L and the right rear wheel 13R in accordance with weight distribution on the rear wheels.

During the four-wheel driving, in the control unit 50, the supposed friction coefficient sµ is determined in accordance with the lateral acceleration Gy and longitudinal acceleration Gx and the stability factor A is determined in accordance with the longitudinal acceleration Gx for calculating the torque distribution ratio α. In accordance with the torque distribution ratio α and the input torque Ti, the restricting torque Tc is calculated. A duty signal corresponding to the calculated restricting torque Tc is applied to the control system 32 so that the clutch 27 is controlled by feedfoward control to produce the torque Tc.

Figure 8:
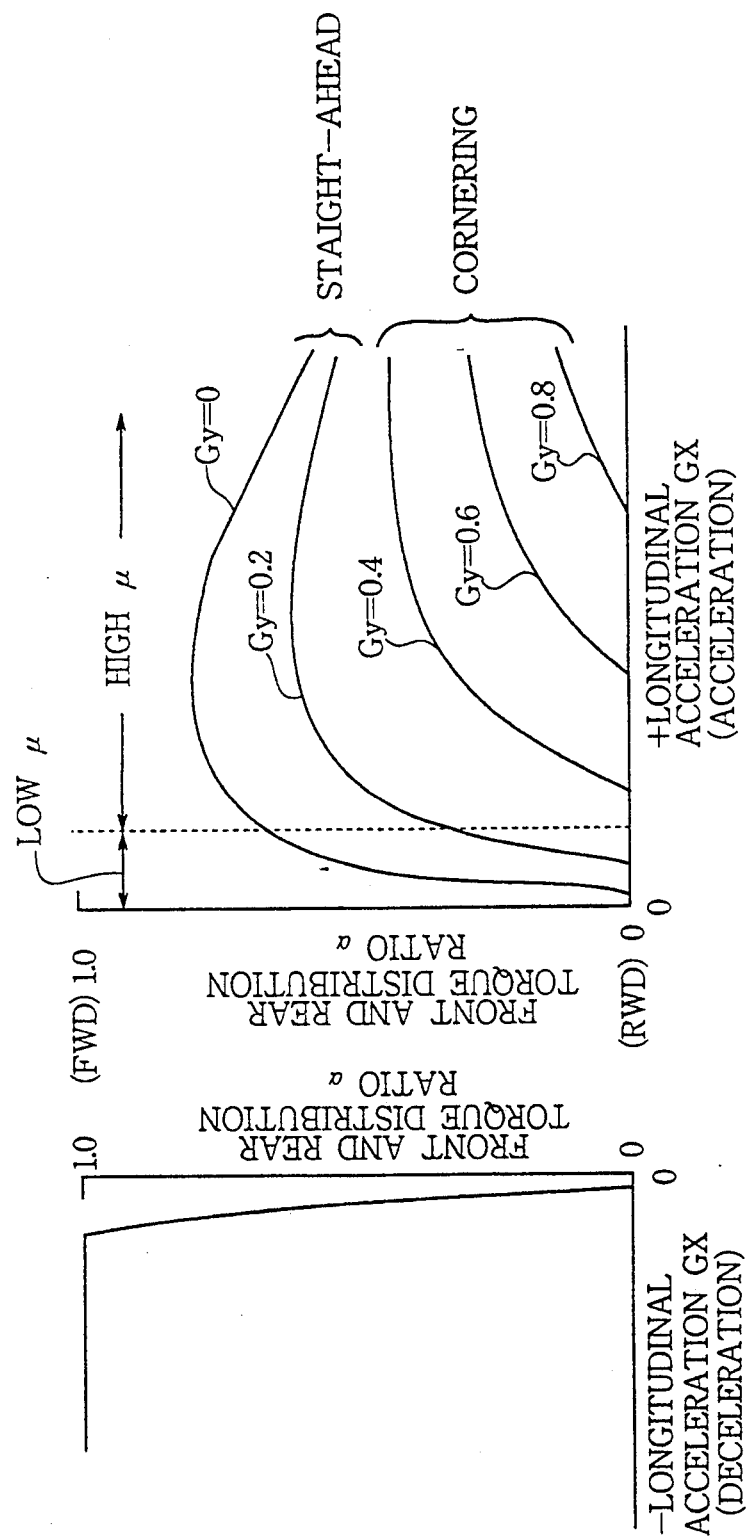
FIG. 8 is a graph showing the controlling characteristics of a torque distribution ratio for distributing the torque to the front wheels and the rear wheels.

FIG. 8 shows controlling characteristics of the torque distribution to the front wheels and the rear wheels. At acceleration, the longitudinal acceleration Gx is positive. In straight-ahead driving where the lateral acceleration Gy is small, the torque distributed to the front wheels is increased so that the vehicle is driven as a front-drive vehicle. If the vehicle is accelerated on a dry road, the longitudinal acceleration Gx is large so that the torque is equally distributed to the front wheels and the rear wheels, thereby providing effective running performance and stable driving.

If the vehicle is accelerated at cornering, the lateral acceleration Gy rises. The torque distributed to the rear wheels is increased, so that the vehicle is driven as a rear-drive vehicle. Thus, understeer is prevented from increasing to insure that the steering characteristic is constant. If the vehicle is driven on the slippery road at a small longitudinal acceleration Gx, the torque is equally distributed or the torque to the front wheels is increased, thereby preventing the slipping of the rear wheels.

At deceleration where the longitudinal acceleration Gx is negative, the torque distribution ratio is determined at all times to increase the torque to the front wheels or to directly engage the differential. Thus, the engine braking effect is effected to reduce tuck-in at deceleration.

On the other hand, the restricting torque Td is calculated in the control unit 50 in accordance with the longitudinal and lateral accelerations Gx, Gy, the supposed friction coefficient sµ and the stability factor A for controlling the clutch 28 in feedfoward control.

FIGS. 9a and 9b show controlling characteristics of the torque distribution to the left rear wheel and the right rear wheel. At acceleration, if the longitudinal acceleration Gy becomes large, a large torque Td is set, so that a moment is produced to reduce the understeer. In this state, the inside wheel of the rear wheels is prevented from slipping to improve the traction. When the vehicle makes a turn during acceleration, the longitudinal and lateral accelerations Gx, Gy become large. A large torque is set to lock the differential. When the vehicle is driven on a slippery road, the torque is set to a minimum so that the differential becomes free, thereby preventing the vehicle from spinning caused by the slipping of the rear wheels at the same time.

At deceleration, the torque is increased in dependency on the deceleration speed and the increase of the lateral acceleration Gy. A moment is produced to cause the understeer, thereby preventing tuck-in.

In the second embodiment, the torque distribution ratio is calculated in accordance with parameters of the longitudinal and lateral accelerations Gx, Gy, the friction coefficient sµ and the desired steering characteristics by the equation of motion expanded to the non-linear zone of the driving performance. Therefore, good steerability is obtained with any surface condition of the road and driving condition thereby improving the steerability during acceleration or deceleration, and causing stable driving, and stability on a slippery road. The rear differential restricting torque is calculated by those parameters so that the same effects as the central differential are obtained. In particular, the slipping of the wheels, and the spinning and tucking-in of the vehicle are effectively prevented. The supposed friction coefficient sµ is used to respond to a rapid change of the surface condition of the road. Since the supposed friction coefficient is smaller than the actual value, safety control is ensured. The supposed coefficient is calculated in accordance with the parameters of the longitudinal and lateral accelerations Gx, Gy and the clutch is controlled in feedfoward control, so that a good response is provided. The desired steering characteristics are determined based on the longitudinal acceleration Gx, so that good steerability at acceleration and stability at deceleration are obtained.

Figure 10:
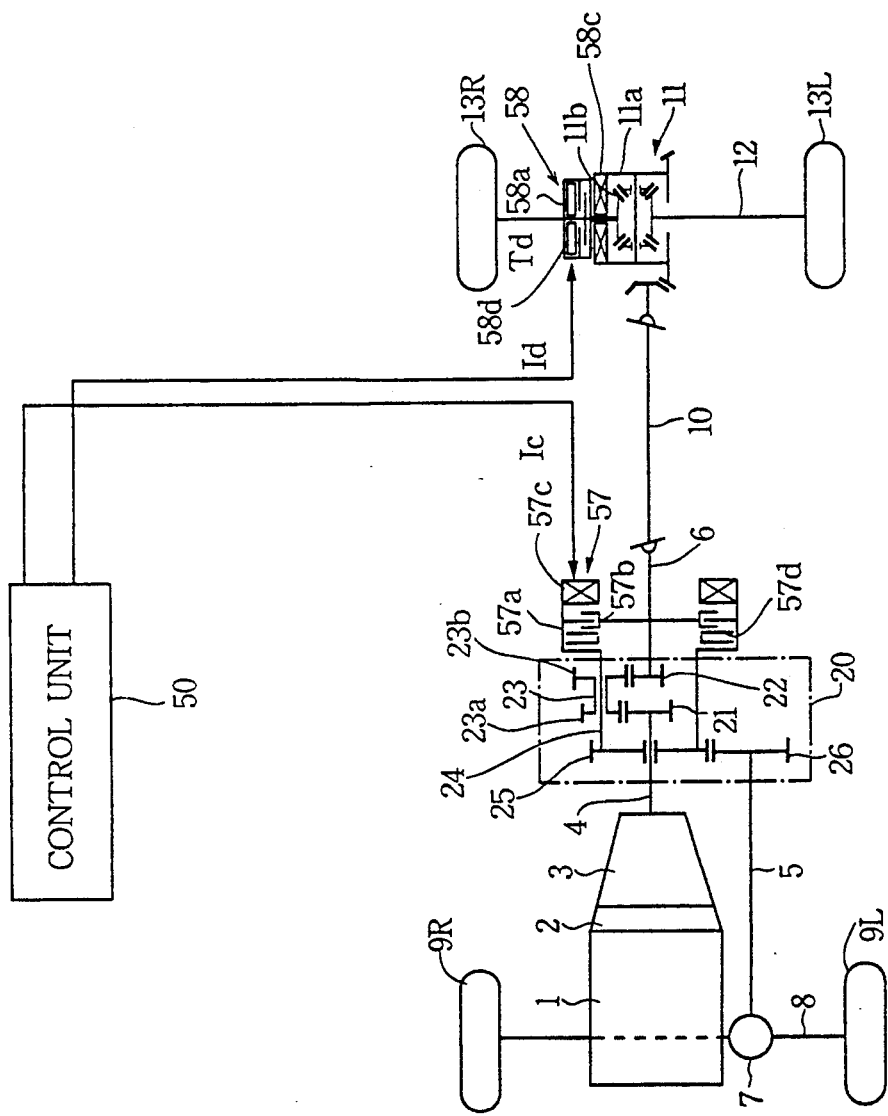
FIG. 10 is a power transmission system showing a third embodiment of the present invention.
Figure 11:
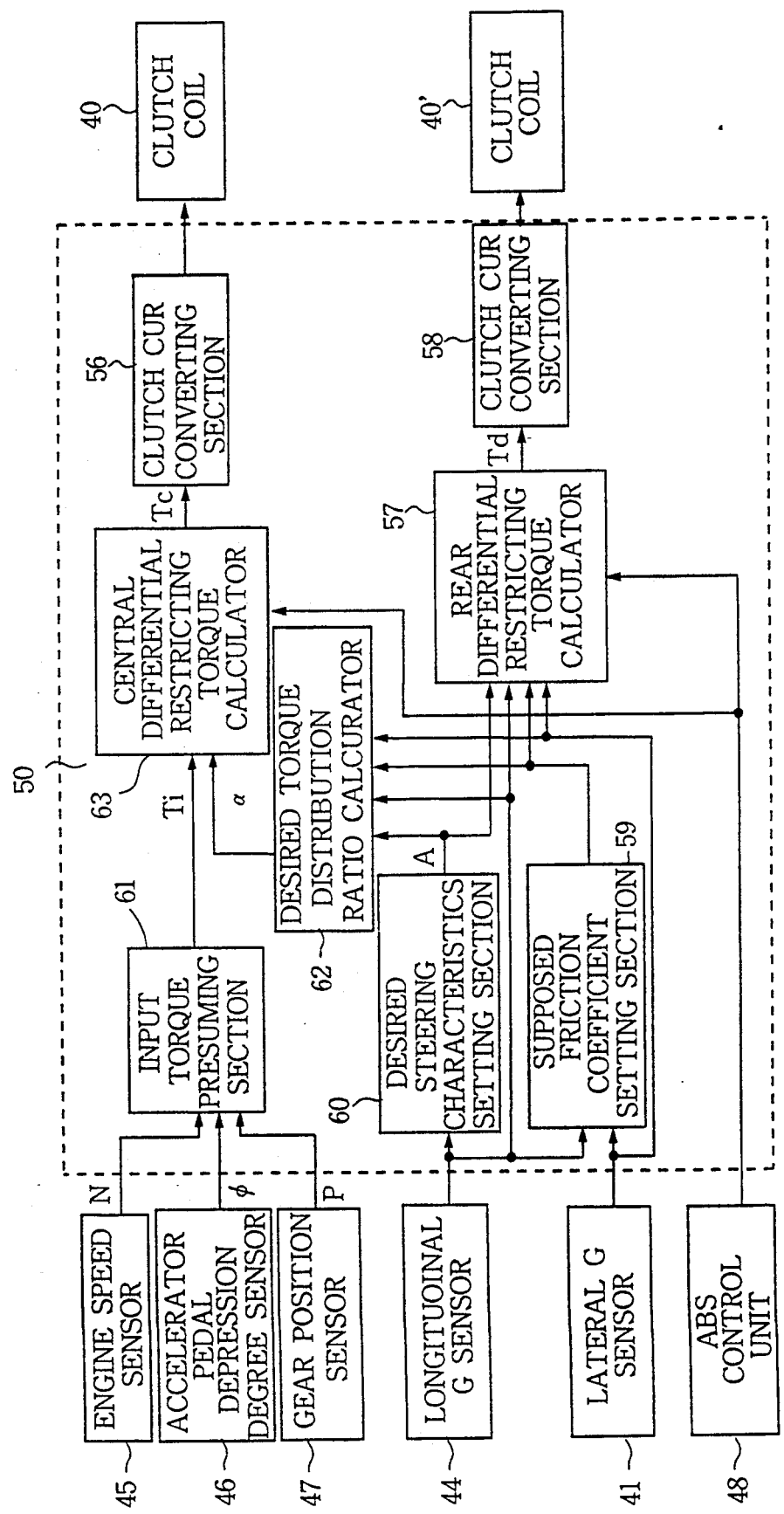
FIG. 11 is a block diagram showing the third embodiment of the present invention.

FIGS. 10 and 11 show a third embodiment of the present invention adapted to an electro-magnetic operated multiple-disk friction clutch instead of the fluid operated multiple-disk friction clutch of the second embodiment. In FIG. 10, electro-magnetic operated multiple-disk friction clutches 57, 58 have coils 57c, 58c and pistons 57d, 58d made from magnetic material. The coil 58c are connected to the control unit 50 and supplied a clutch current calculated in a clutch current converting section 60 in accordance with the driving conditions. The third embodiment does not need a hydraulic circuit and makes it possible to easily adapt to such a transmission which is not provided with a hydraulic circuit but a lubricating circuit as a manual transmission.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system for distributing torque to each wheel of a four-wheel drive motor vehicle having, an engine mounted on said motor vehicle, a transmission connected to said engine, output members operatively connected between said transmission and said each wheel for transmitting said torque from said engine to said each wheel, a differential interposed between said each wheel for absorbing a speed difference of said each wheel, a clutch mounted on said differential for controlling torque distribution to said each wheel, a vehicle speed sensor for detecting a vehicle speed and for generating a vehicle speed signal, a lateral G-sensor for detecting lateral acceleration in a lateral direction of said motor vehicle and for generating a lateral acceleration signal, and a steering angle sensor for sensing a steering angle and for producing a steering angle signal, an improvement of the system which comprises:

ideal acceleration calculating means responsive to said vehicle speed signal and said steering angle signal for calculating an ideal acceleration by referring to a standard value in a map and for producing an ideal acceleration signal;

actual acceleration calculating means responsive to said lateral acceleration signal for calculating an actual acceleration and for producing an actual acceleration signal;

determining means responsive to said ideal and actual acceleration signals for determining a breakaway point by comparing actual data with breakaway data and for producing a breakaway signal;

difference calculating means responsive to said ideal and actual acceleration signals for calculating a spinning degree of said motor vehicle and for producing an absolute signal; and setting means responsive to said breakaway and absolute signals for deciding a control value of a clutch in order to obtain an optimum control of said clutch so as to accurately minimize said spinning degree of said motor vehicle and to improve stability of vehicle behavior.

2. A control system for distributing torque to each wheel of a four-wheel drive motor vehicle having, an engine mounted on said motor vehicle, a transmission connected to said engine, output members operatively connected between said transmission and said each wheel for transmitting said torque from said engine to said each wheel, a central differential interposed between front wheels and rear wheels for absorbing a speed difference between said front wheels and rear wheels, a central clutch mounted on said central differential for controlling torque distribution to said each wheel, a rear differential interposed between left and right rear wheels for absorbing a rear wheel speed difference, a rear clutch mounted on said rear differential for controlling said torque distribution to said each rear wheel, an engine speed sensor for detecting an engine speed and for generating an engine speed signal, an accelerator sensor for sensing a depressing degree of an accelerator pedal and for generating an accelerator signal, a position sensor for detecting a gear position and for generating a position signal, a longitudinal G-sensor for detecting longitudinal acceleration in a longitudinal direction of said motor vehicle and for generating a longitudinal acceleration signal, and a lateral G-sensor for detecting lateral acceleration in a lateral direction of said motor vehicle and for generating a lateral acceleration signal, an improvement of the system which comprises:

input torque presuming means responsive to said engine signal, said accelerator signal and said position signal for calculating an input torque and for producing an input torque signal;

calculating means responsive to said longitudinal acceleration signal for calculating desired steering characteristics and for producing a desired steering signal;

setting means responsive to said lateral and longitudinal acceleration signals for setting a supposed friction coefficient by comparing actual data with standard data and for producing a coefficient signal;

torque distribution calculating means responsive to said ideal steering signal, said longitudinal and lateral acceleration signals, and said coefficient signal for calculating a desired torque distribution ratio to said front and rear wheels of said motor vehicle and for producing a ratio signal;

torque calculating means responsive to said input torque signal and said ratio signal for calculating a first control value of a first clutch in order to obtain an optimum control of said central clutch so as to accurately minimize slipping of said motor vehicle and to improve a stability of said vehicle at braking operation; and rear torque calculating means responsive to said desired steering signal, said longitudinal and lateral acceleration signals, and said coefficient signal for calculating a second control value of a second clutch in order to control said rear clutch so as to accurately minimize said spinning degree of said motor vehicle and to improve stability of vehicle attitude.

* * * * *